J. F. ARTHUR

Nov. 11, 1930. CIRCULATING TUBE Re. 17,866

Original Filed Oct. 2, 1926

INVENTOR.

BY James F. Arthur

Martin T. Fisher ATTORNEY.

Reissued Nov. 11, 1930

Re. 17,866

UNITED STATES PATENT OFFICE

JAMES F. ARTHUR, OF DICKSON CITY, PENNSYLVANIA

CIRCULATING TUBE

Original No. 1,639,252, dated August 16, 1927, Serial No. 139,209, filed October 2, 1926. Application for reissue filed February 18, 1928. Serial No. 255,454.

This invention is a method of securing together a tube of relatively thin metal and a bushing or the like, of relatively heavy metal. The invention also consists in the new article of manufacture, consisting of a thin tube anchored in a heavier bushing, resulting from the practice of the method. According to this invention the tube and bushing are permanently anchored together, without the necessity of threading the tube, and without the use of solder or brazing or like operations involving the use of heat.

The eliminations of the necessity of threading the tube permits the use of relatively thin metal, the bushing of heavier metal carrying the necessary threads.

The invention described in this application is an improvement over that shown in my Patent No. 1,639,251, dated August 16, 1927.

The article of manufacture covered by this invention, consisting essentially of a thin metal tube permanently secured in a threaded bushing, finds an extensive use in feed pipes for kitchen range boilers. The invention however, is not to be limited to this use, but is intended to extend to any situation where an article of this nature may be applied.

According to this invention, a bushing of relatively heavy metal is provided with an interior annular recess. The end of the thin walled tube is inserted in the bushing, and by the use of suitable tools, as will be described, the metal of the tube is expanded into tight engagement with this annular recess, thus permanently locking the tube and bushing together. The end of the thin walled tube is well inside the bushing, and the bushing is provided with a suitable stop, such as an interior annular shoulder, against which the end of the tube is placed before it is expanded into the annular recess of the bushing, as described above.

A modification of the invention consists in a thin walled tube anchored in a threaded bushing, as above described, the other end of the thin tube being closed, while the sides of the tube are provided with perforations for the lateral exit of water. This modification is of particular use with range boilers, serving to direct the entering water laterally instead of downwardly, so that it will not stir up the sediment that collects in the bottom of the boiler.

The invention will now be explained in more detail by reference to the accompanying drawing, illustrating by way of example, the new article of manufacture and the method of making it. It should be understood that the invention is not to be limited to the exact details here shown, but that it may be carried out in other ways, as defined within the scope of the claims. In the drawings, Fig. 1 is a sectional view showing the first step of the method of the invention;

Figure 1:
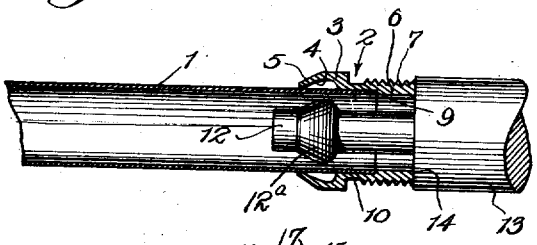
Figure 2:
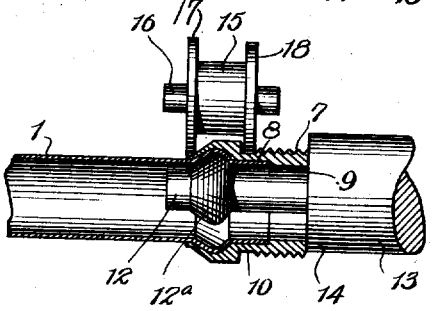
Fig. 2 is a sectional view showing the second step.

Referring now to these drawings in which similar reference characters indicate similar parts, 1 is a thin walled tube, which may be of copper, brass, fiber or other material and may be about $\frac{1}{32}$ of an inch thick. It will be understood that the invention is not to be limited to exact dimensions.

The bushing 2 to which the tube 1 is to be secured comprises the portion 3 of substantial thickness, having an interior annular recess 4 and an exterior inwardly sloped portion 5. The exterior of part 3 is provided with a plurality of flat sides $3^a$ so that it can be turned with a wrench.

The bushing 2 also comprises the substantially cylindrical part 6 having exterior screw threads 7; the bushing is interiorly cut out at 8 to form a shoulder 9 against which the end of the tube 1 is adapted to rest. The bushing is also provided with a cylindrical portion 10.

The tube and bushing are assembled by placing the tube in the bushing with its end resting against the shoulder 9, as shown in Fig. 1. The tube and bushing are then slipped over a rotating mandrel 12 carried by the head piece 13 having a wall 14 which furnishes a stop against which the right-hand end of the bushing rests. The mandrel 12 is provided with an annular bulge 12[a], the exterior of which is substantially the same shape as the interior of the annular recess 4 of the bushing.

An idler wheel 15 carried by a shaft 16 is mounted near the mandrel 12 to have movement toward and away from the mandrel. This wheel 15 has flanges 17 and 18 which are adapted to bear against portions 5 and 10 respectively of the bushing. The flange 17 bears against the extreme outer or left-hand edge of portion 5. The wheel 15 is moved toward the mandrel 12 with such force, that the bulge 12[a] on the mandrel forces the metal of the tube 1 outwardly into tight engagement with the wall of the recess 4 of the bushing, thus locking the tube and bushing together. The operation just described forms an outwardly expanded annular shoulder on the tube shown at 19 in Fig. 3. The pressure of the two flanges 17 and 18 against the bushing and tube forces the metal of the tube into close and intimate contact with the bushing all the way from that end of the tube, seated against the shoulder 9, to the left-hand end of the part 5 of the bushing.

The tube and bushing are thereby anchored together quickly, securely and rigidly, and the resulting article of manufacture may be secured in operative position by means of the screw threads 7 on the bushing.

Figure 3:
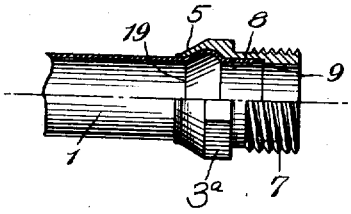
Fig. 3 is a sectional view showing the finished joint.
Figure 4:
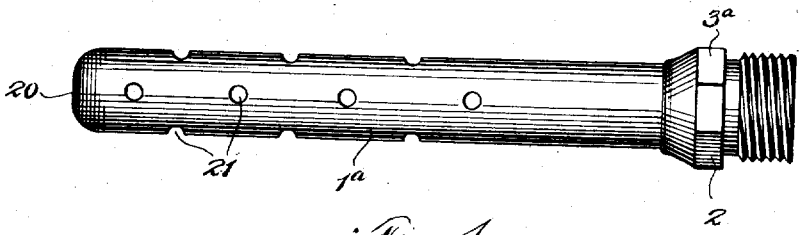
Fig. 4 is a view of a modification.

Referring now to Fig. 4 there is shown a circulating tube for a hot water heating boiler, comprising a thin walled tube 1[a], the end 20 of which is closed and which is provided with a plurality of openings 21 for the lateral escape of water, whereby the water delivered by the tube is directed laterally instead of downwardly, so that it will not stir up the sediment in the bottom of the tank or boiler. This tube 1[a] is secured in the bushing 2 as shown in Fig. 3.

I claim as my invention:

1. A circulating tube for hot water heating boilers, comprising a tube of relatively thin metal, one end of the tube being closed and the sides of the tube having holes for lateral exit of water, the other end of the tube being anchored in a threaded bushing of heavier metal, the bushing having an interior annular recess and the tube having an outwardly extending annular shoulder fitting into the recess, whereby the tube and bushing are permanently secured together.

2. A circulating tube comprising an exteriorly threaded bushing having an interior annular recess and an interior annular shoulder, and a thin walled tube, the end of which is inside the bushing against said shoulder and which is provided with an annular outwardly expanded portion in contact with the wall of said annular recess.

3. A circulating tube comprising a thin walled tube and an exteriorly threaded bushing of heavier metal having an interior annular recess, the thin walled tube being expanded outwardly into contact with the wall of said recess for securing the bushing in place on the tube, the bushing having a head to which a wrench may be applied.

4. A circulating tube comprising an exteriorly threaded bushing having an interior annular recess and an interior annular shoulder, and a thin walled tube, the end of which is inside the bushing against said shoulder and which is provided with an annular outwardly expanded portion in contact with the wall of said annular recess, the bushing having a head to which a wrench may be applied.

5. A circulating-tube connection, comprising a relatively-thin tube struck outwardly near one of its ends to form an outwardly-projecting coupling-bead in combination with a relatively-heavy bushing exteriorly threaded, formed with an inwardly-opening annular coupling-recess to receive the coupling-bead of the tube and with a wrench-receiving rib.

6. A circulating-tube connection, comprising a relatively-thin tube struck outwardly near one of its ends to form an outwardly-projecting coupling-bead in combination with a relatively-heavy bushing exteriorly threaded, formed with an inwardly-opening annular coupling-recess to receive the coupling-bead of the tube and with a wrench-receiving rib, and with an interiorly-located abutment-shoulder to form a stop for the tube.

7. As an article of manufacture, a circulating tube for hot water boilers and the like, comprising an exteriorly threaded interiorly recessed bushing of heavy metal provided with a wrench-receiving head, and a thin walled tube which is permanently secured at one end to the bushing by a portion of the tube which is expanded outwardly into contact with the wall of the recess of the bushing, the walls of the tube being provided with holes for the lateral exit of water and the outer end of the tube being closed.

8. In a circulating tube for hot water boilers wherein the tube portion is thin walled, it is closed at one end and is provided with holes for the lateral exit of water, a bushing of heavy metal having an interior annular recess, the thin walled tube being expanded outwardly into contact with the wall of said recess, thereby anchoring the tube in place in the bushing.

9. In a circulating tube for hot water boilers wherein the tube portion is thin walled, is closed at one end and is provided with holes for the lateral exit of water, a bushing of heavy metal having an interior annular recess, and an interior annular shoulder, the other end of the thin walled tube bearing against said annular shoulder and having a portion thereof expanded outwardly into contact with the wall of the annular recess, thereby anchoring the tube in place in the bushing.

In testimony whereof I affix my signature.

JAMES F. ARTHUR.